(12) United States Patent
Mackay et al.

(10) Patent No.: US 11,764,595 B2
(45) Date of Patent: Sep. 19, 2023

(54) CLAMPING CURRENT LIMIT OF A HYSTERETIC POWER CONVERTER TO A MINIMUM VALUE TO ENSURE GRACEFUL SHUTDOWN AT BATTERY END OF LIFE

(71) Applicant: Cirrus Logic International Semiconductor Ltd., Edinburgh (GB)

(72) Inventors: Graeme G. Mackay, Austin, TX (US); Ajit Sharma, Austin, TX (US); Jason W. Lawrence, Austin, TX (US); Eric J. King, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 68 days.

(21) Appl. No.: 17/237,373

(22) Filed: Apr. 22, 2021

(65) Prior Publication Data

US 2022/0037903 A1     Feb. 3, 2022

Related U.S. Application Data

(60) Provisional application No. 63/058,060, filed on Jul. 29, 2020.

(51) Int. Cl.
| | | |
|---|---|---|
| *H02J 7/00* | (2006.01) | |
| *H01M 10/44* | (2006.01) | |
| *H02M 3/158* | (2006.01) | |

(52) U.S. Cl.
CPC ........... *H02J 7/0048* (2020.01); *H01M 10/44* (2013.01); *H02M 3/1582* (2013.01)

(58) Field of Classification Search
CPC .... H02J 7/0048; H02J 2207/20; H01M 10/44; H02M 3/1582

(Continued)

(56) References Cited

U.S. PATENT DOCUMENTS

| | | | | |
|---|---|---|---|---|
| 5,179,508 A | * | 1/1993 | Lange | H02M 3/156 |
| | | | | 361/111 |
| 7,906,939 B2 | * | 3/2011 | Kung | H02M 1/36 |
| | | | | 320/128 |

FOREIGN PATENT DOCUMENTS

| | | |
|---|---|---|
| CN | 209709724 U | 11/2019 |
| FR | 2851091 A1 | 8/2004 |

OTHER PUBLICATIONS

International Search Report and Written Opinion of the International Searching Authority, International Application No. PCT/US2021/041535, dated Oct. 14, 2021.

(Continued)

*Primary Examiner* — Nathaniel R Pelton
(74) *Attorney, Agent, or Firm* — Jackson Walker L.L.P

(57) ABSTRACT

A system may include a power source, a power converter having an input coupled to the power source and an output for supplying electrical energy to a load, and a control circuit for controlling operation of the power converter. The control circuit may include a first feedback control subsystem configured to monitor an output voltage present at the output of the power converter and regulate the output voltage at or about a predetermined regulated voltage level in a normal mode of operation of the power converter and a second feedback control subsystem configured to monitor an input voltage present between the power source and the input of the power converter and responsive to the input voltage decreasing below a predetermined minimum voltage level, causing the power converter to operate in a protection mode of operation in order to maintain the input voltage at or about the predetermined minimum voltage level.

18 Claims, 16 Drawing Sheets

(58) Field of Classification Search
USPC .......................................................... 320/134
See application file for complete search history.

(56) References Cited

OTHER PUBLICATIONS

Combined Search and Examination Report under Sections 17 and 18(3), United Kingdom Intellectual Property Office, Application No. GB2110371.8, dated Jan. 13, 2022.

* cited by examiner

US 11,764,595 B2

CLAMPING CURRENT LIMIT OF A HYSTERETIC POWER CONVERTER TO A MINIMUM VALUE TO ENSURE GRACEFUL SHUTDOWN AT BATTERY END OF LIFE

RELATED APPLICATION

The present disclosure claims priority to U.S. Provisional Patent Application Ser. No. 63/058,060, filed Jul. 29, 2020, which is incorporated by reference herein in its entirety.

FIELD OF DISCLOSURE

The present disclosure relates in general to circuits for electronic devices, including without limitation personal audio devices such as wireless telephones and media players, and more specifically, to prediction of a load current and a control current in a power converter using output voltage thresholds.

BACKGROUND

Personal audio devices, including wireless telephones, such as mobile/cellular telephones, cordless telephones, mp3 players, and other consumer audio devices, are in widespread use. Such personal audio devices may include circuitry for driving a pair of headphones or one or more speakers. Such circuitry often includes a speaker driver including a power amplifier for driving an audio output signal to headphones or speakers. Oftentimes, a power converter may be used to provide a supply voltage to a power amplifier in order to amplify a signal driven to speakers, headphones, or other transducers. A switching power converter is a type of electronic circuit that converts a source of power from one direct current (DC) voltage level to another DC voltage level. Examples of such switching DC-DC converters include but are not limited to a boost converter, a buck converter, a buck-boost converter, an inverting buck-boost converter, and other types of switching DC-DC converters. Thus, using a power converter, a DC voltage such as that provided by a battery may be converted to another DC voltage used to power the power amplifier.

A power converter may be used to provide supply voltage rails to one or more components in a device. Accordingly, it may be desirable to regulate an output voltage of a power converter with minimal ripple in the presence of a time-varying current and power load.

SUMMARY

In accordance with the teachings of the present disclosure, one or more disadvantages and problems associated with existing approaches to regulating an output voltage of a power converter may be reduced or eliminated.

In accordance with embodiments of the present disclosure, a system may include a power source, a power converter having an input coupled to the power source and an output for supplying electrical energy to a load, and a control circuit for controlling operation of the power converter. The control circuit may include a first feedback control subsystem configured to monitor an output voltage present at the output of the power converter and regulate the output voltage at or about a predetermined regulated voltage level in a normal mode of operation of the power converter and a second feedback control subsystem configured to monitor an input voltage present between the power source and the input of the power converter and responsive to the input voltage decreasing below a predetermined minimum voltage level, causing the power converter to operate in a protection mode of operation in order to maintain the input voltage at or about the predetermined minimum voltage level.

In accordance with these and other embodiments of the present disclosure, a method may include, in a system including a power source and a power converter having an input coupled to the power source and an output for supplying electrical energy to a load, monitoring, with a first feedback control system, an output voltage present at the output of the power converter and regulating the output voltage at or about a predetermined regulated voltage level in a normal mode of operation of the power converter; monitoring, with a second feedback control subsystem, an input voltage present between the power source and the input of the power converter; and responsive to the input voltage decreasing below a predetermined minimum voltage level, causing, by the second feedback control subsystem, the power converter to operate in a protection mode of operation in order to maintain the input voltage at or about the predetermined minimum voltage level.

In accordance with these and other embodiments of the present disclosure, a mobile device may include a power source, a power converter having an input coupled to the power source and an output for supplying electrical energy, one or more components downstream of the power converter and configured to receive power from the electrical energy supplied by the power converter, and a control circuit for controlling operation of the power converter. The control circuit may include a first feedback control subsystem configured to monitor an output voltage present at the output of the power converter and regulate the output voltage at or about a predetermined regulated voltage level in a normal mode of operation of the power converter and a second feedback control subsystem configured to monitor an input voltage present between the power source and the input of the power converter, and responsive to the input voltage decreasing below a predetermined minimum voltage level, causing the power converter to operate in a protection mode of operation in order to maintain the input voltage at or about the predetermined minimum voltage level.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
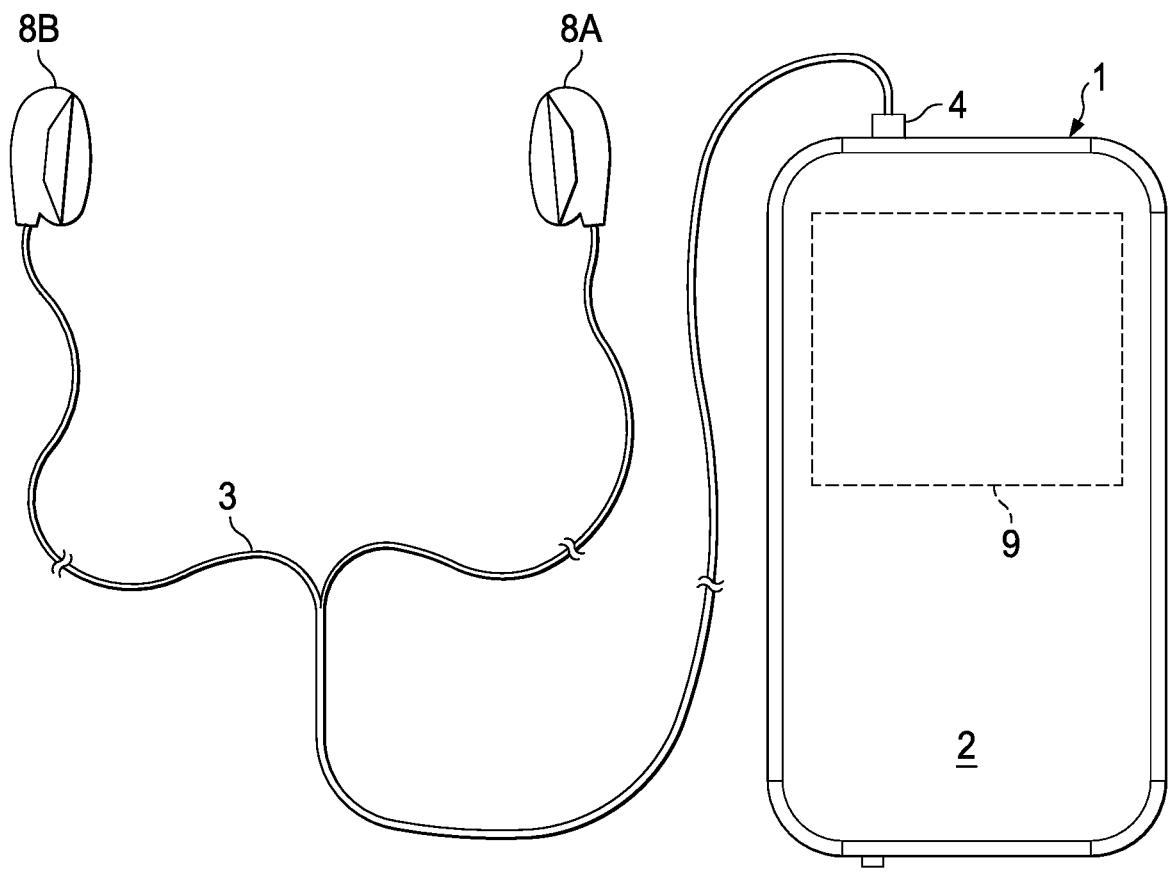
FIG. 1 illustrates an example mobile device, in accordance with embodiments of the present disclosure.

FIG. 1 illustrates an example mobile device 1, in accordance with embodiments of the present disclosure. FIG. 1 depicts mobile device 1 coupled to a headset 3 in the form of a pair of earbud speakers 8A and 8B. Headset 3 depicted in FIG. 1 is merely an example, and it is understood that mobile device 1 may be used in connection with a variety of audio transducers, including without limitation, headphones, earbuds, in-ear earphones, and external speakers. A plug 4 may provide for connection of headset 3 to an electrical terminal of mobile device 1. Mobile device 1 may provide a display to a user and receive user input using a touch screen 2, or alternatively, a standard liquid crystal display (LCD) may be combined with various buttons, sliders, and/or dials disposed on the face and/or sides of mobile device 1.

Figure 2:
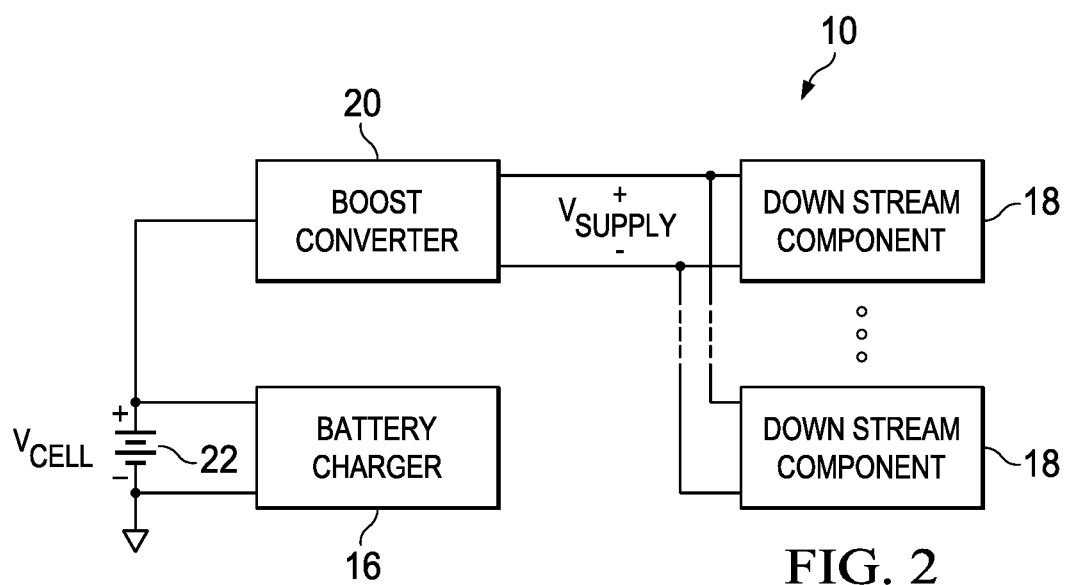
FIG. 2 illustrates a block diagram of selected components of a power delivery network internal to a mobile device, in accordance with embodiments of the present disclosure.

FIG. 2 illustrates a block diagram of selected components of a power delivery network 10 that may be integral to mobile device 1, in accordance with embodiments of the present disclosure. As shown in FIG. 2, power delivery network 10 may include a boost converter 20 configured to boost a battery voltage $V_{CELL}$ to generate a supply voltage $V_{SUPPLY}$ to a plurality of downstream components 18 of power delivery network 10. Downstream components 18 of power delivery network 10 may include any suitable functional circuits or devices of power delivery network 10, including without limitation processors, audio coder/decoders, amplifiers, display devices, etc. As shown in FIG. 2, power delivery network 10 may also include a battery charger 16 for recharging battery 22.

In some embodiments of power delivery network 10, boost converter 20 and battery charger 16 may comprise the only components of power delivery network 10 electrically coupled to battery 22, and boost converter 20 may electrically interface between battery 22 and all downstream components of power delivery network 10. However, in other embodiments of power delivery network 10, some downstream components 18 may electrically couple directly to battery 22.

Figure 3A:
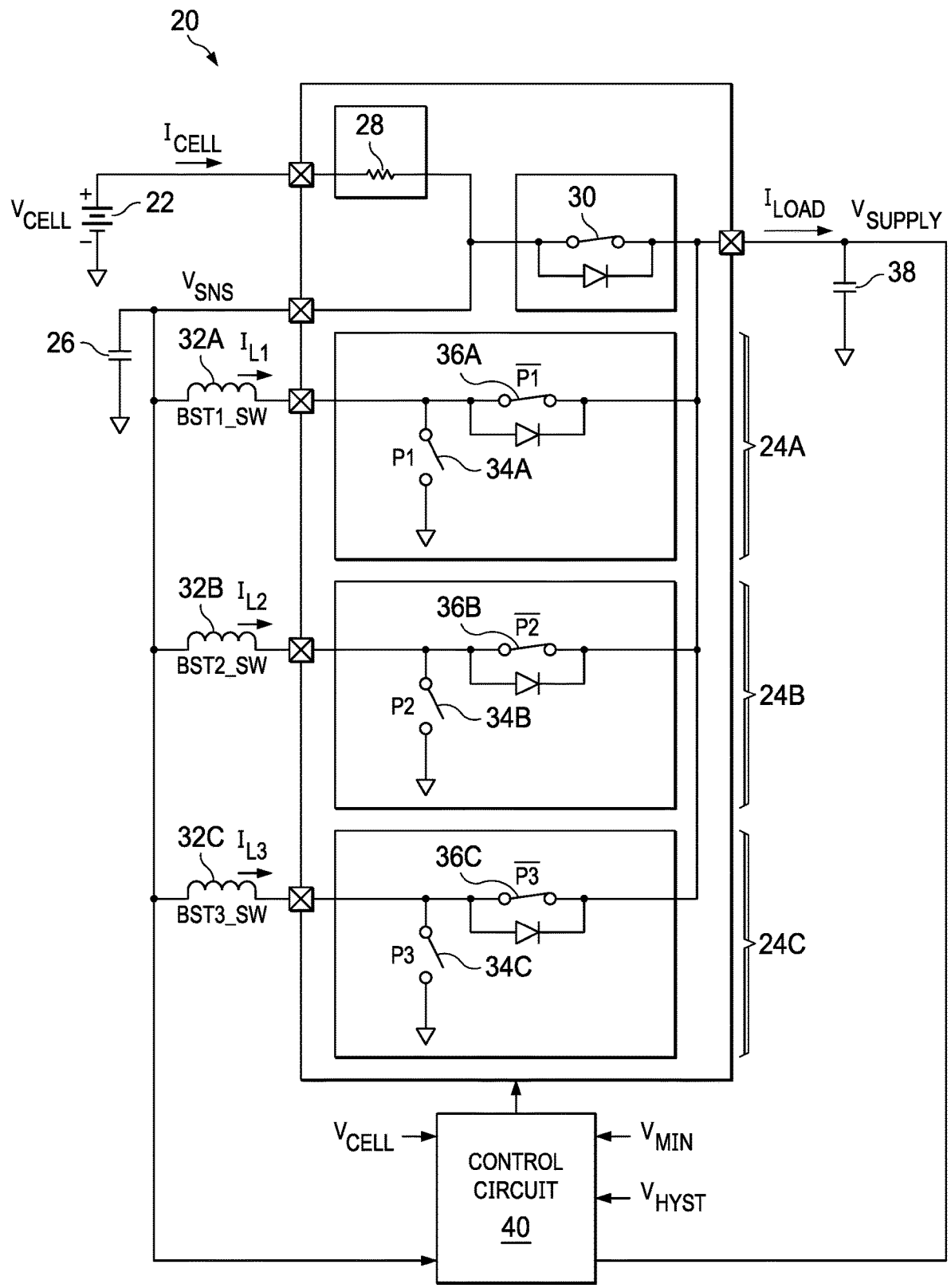
FIG. 3A illustrates a block diagram of selected components of an example boost converter with multiple modes of operation depicting operation in a bypass mode, in accordance with embodiments of the present disclosure.

FIG. 3A illustrates a block diagram of selected components of an example boost converter 20 with multiple modes of operation depicting operation in a bypass mode, in accordance with embodiments of the present disclosure. As shown in FIG. 3A, boost converter 20 may include a battery 22, a plurality of inductive boost phases 24, a sense capacitor 26, a sense resistor 28, a bypass switch 30, and a control circuit 40. As shown in FIG. 3A, each inductive boost phase 24 may include a power inductor 32, a charge switch 34, a rectification switch 36, and output capacitor 38.

Figure 3B:
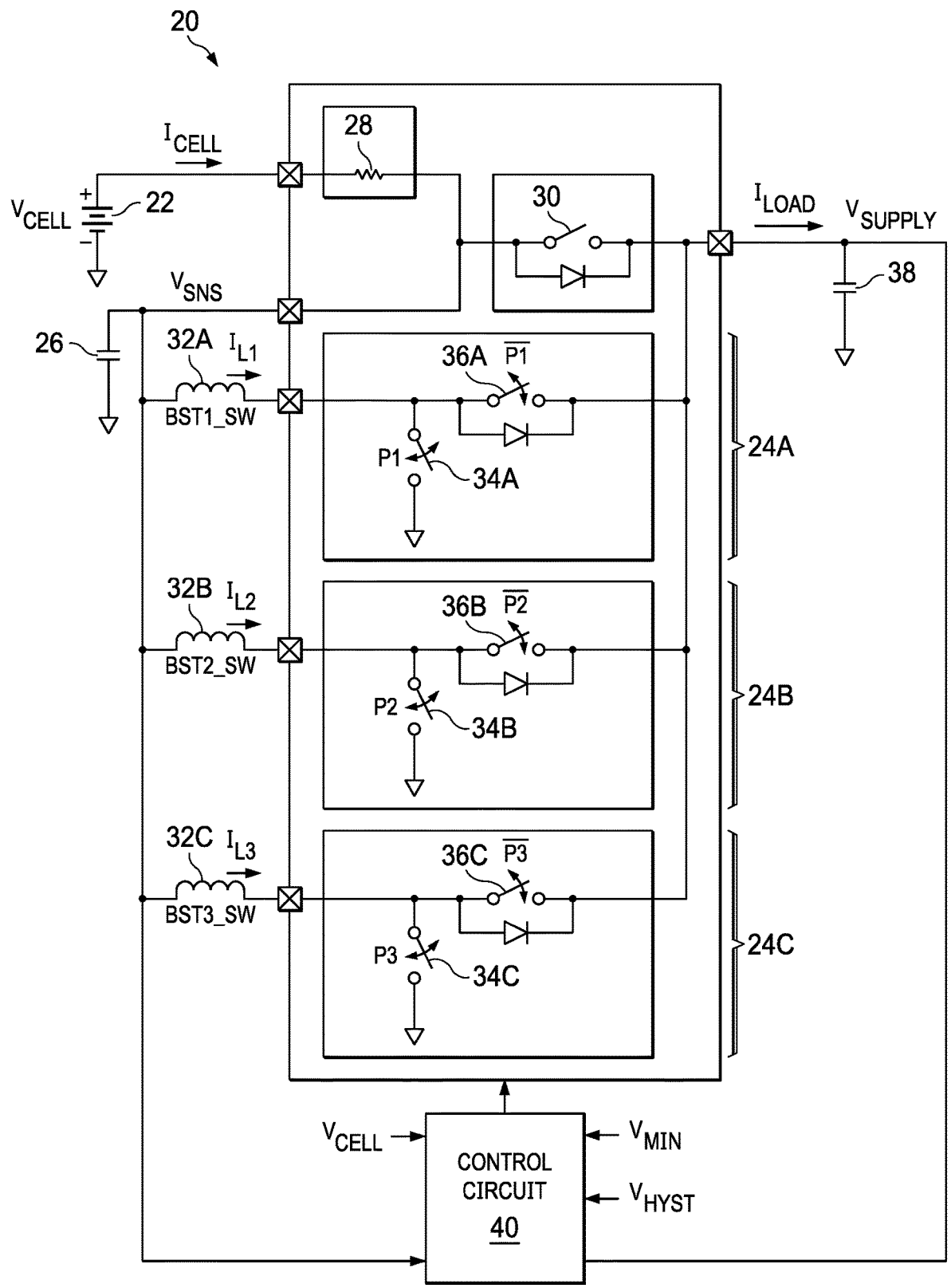
FIG. 3B illustrates a block diagram of selected components of an example boost converter with multiple modes of operation depicting operation in a boost active mode, in accordance with embodiments of the present disclosure.
Figure 3C:
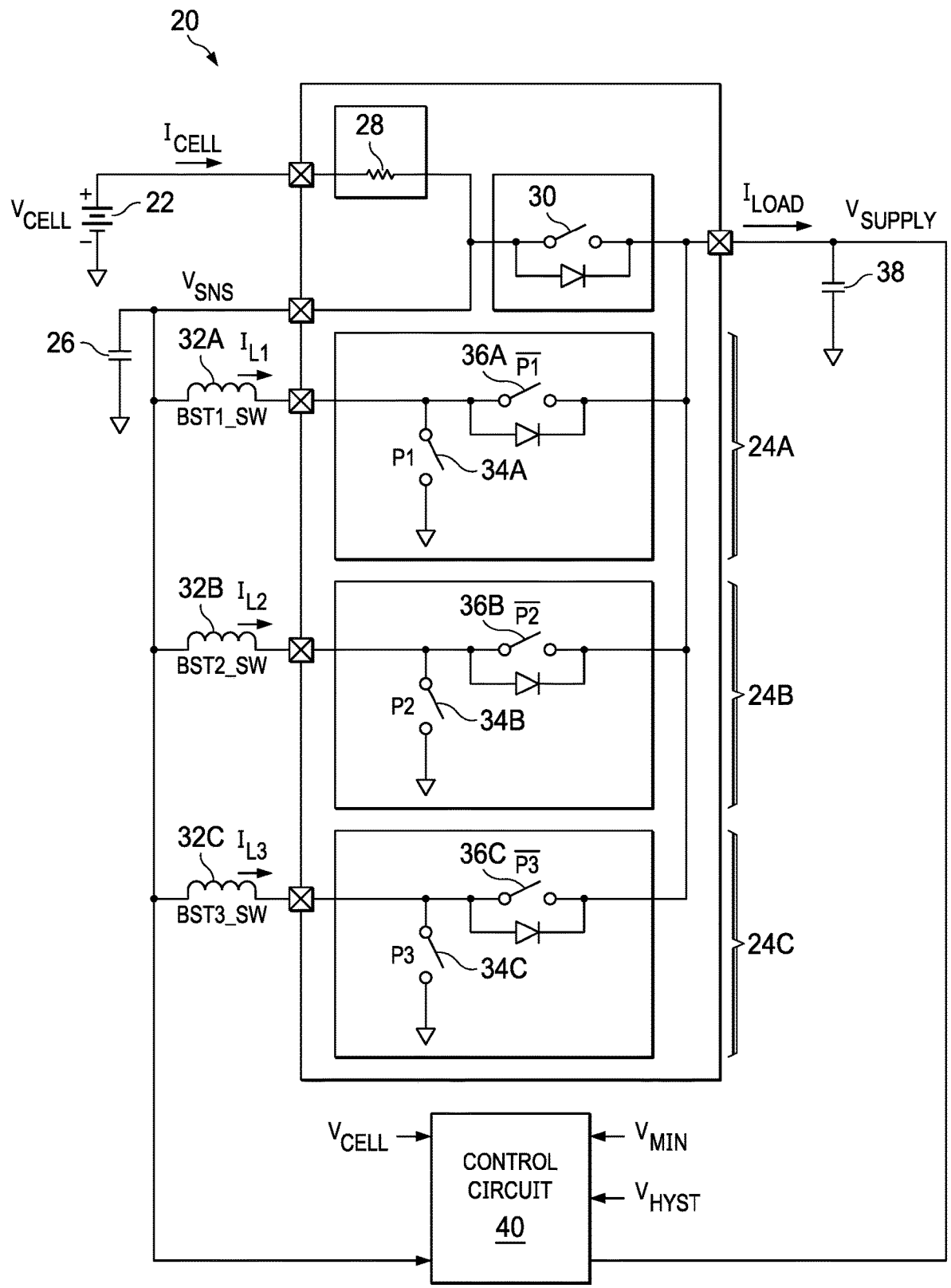
FIG. 3C illustrates a block diagram of selected components of an example boost converter with multiple modes of operation depicting operation in a boost inactive mode, in accordance with embodiments of the present disclosure.

Although FIGS. 3A-3C depict boost converter 20 having three inductive boost phases 24, embodiments of boost converter 20 may have any suitable number of inductive boost phases 24. In some embodiments, boost converter 20 may comprise three or more inductive boost phases 24. In other embodiments, boost converter 20 may comprise fewer than three phases (e.g., a single phase or two phases).

Boost converter 20 may operate in the bypass mode when supply voltage $V_{SUPPLY}$ generated by boost converter 20 is greater than a threshold minimum voltage $V_{MIN}$. In some embodiments, such threshold minimum voltage $V_{MIN}$ may be a function of a monitored current (e.g., a current through sense resistor 28). In some embodiments, such threshold minimum voltage $V_{MIN}$ may be varied in accordance with variations in the monitored current, in order to provide desired headroom from components supplied from supply voltage $V_{SUPPLY}$. Control circuit 40 may be configured to sense supply voltage $V_{SUPPLY}$ and compare supply voltage $V_{SUPPLY}$ to threshold minimum voltage $V_{MIN}$. In the event that supply voltage $V_{SUPPLY}$ and sense voltage $V_{SNS}$ across sense capacitor 26 are greater than threshold minimum voltage $V_{MIN}$, control circuit 40 may activate (e.g., enable, close, turn on) bypass switch 30 and one or more rectification switches 36 and deactivate (e.g., disable, open, turn off) charge switches 34. In such bypass mode, the resistances of rectification switches 36, power inductors 32, and bypass switch 30 may combine to minimize a total effective resistance of a path between battery 22 and supply voltage $V_{SUPPLY}$.

FIG. 3B illustrates a block diagram of selected components of example boost converter 20 depicting operation in a boost active mode, in accordance with embodiments of the present disclosure. Boost converter 20 may operate in the boost active mode when supply voltage $V_{SUPPLY}$ is insufficient to maintain supply voltage $V_{SUPPLY}$ above threshold minimum voltage $V_{MIN}$. In the boost active mode, control circuit 40 may deactivate (e.g., disable, open, turn off) bypass switch 30, and periodically commutate charge switches 34 (e.g., during a charging state of a phase 24) and rectification switches 36 (e.g., during a transfer state of a phase 24) of inductive boost phase 24 (as described in greater detail below) by generating appropriate control signals $P_1$, $\overline{P_1}$, $P_2$, $\overline{P_2}$, $P_3$, and $\overline{P_3}$, to deliver a current $I_{BAT}$ and boost battery voltage $V_{BAT}$ to a higher supply voltage $V_{SUPPLY}$ in order to provide a programmed (or servoed) desired current (e.g., average current) to the electrical node of supply voltage $V_{SUPPLY}$, while maintaining supply voltage $V_{SUPPLY}$ above threshold minimum voltage $V_{MIN}$. In the boost active mode, sense voltage $V_{SNS}$ may fall below threshold minimum voltage $V_{MIN}$. Further, in the boost active mode, boost converter 20 may operate as a single phase boost converter or multi-phase boost converter.

In the boost active mode, control circuit 40 may operate boost converter 20 by operating inductive boost phase 24 in a peak and valley detect operation, as described in greater detail below. The resulting switching frequency of charge switches 34 and rectification switches 36 of inductive boost phase 24 may be determined by sense voltage $V_{SNS}$, supply voltage $V_{SUPPLY}$, an inductance of power inductor 32A, and a programmed ripple parameter (e.g., a configuration of a target current ripple in power inductor 32A).

FIG. 3C illustrates a block diagram of selected components of boost converter 20 depicting operation in a boost inactive mode, in accordance with embodiments of the present disclosure. Boost converter 20 may operate in the boost inactive mode when supply voltage $V_{SUPPLY}$ generated by boost converter 20 rises above a sum of threshold minimum voltage $V_{MIN}$ and a hysteresis voltage $V_{HYST}$ and a sense voltage $V_{SNS}$ remains below threshold minimum voltage $V_{MIN}$. In the boost inactive mode, control circuit 40 may deactivate (e.g., disable, open, turn off) bypass switch 30, charge switches 34, and rectification switches 36. Thus, when sense voltage $V_{SNS}$ remains below threshold minimum voltage $V_{MIN}$, control circuit 40 prevents boost converter 20 from entering the bypass mode in order to not backpower battery 22 from supply voltage $V_{SUPPLY}$. Further, if supply voltage $V_{SUPPLY}$ should fall below threshold minimum voltage $V_{MIN}$, control circuit 40 may cause boost converter 20 to again enter the boost active mode in order to increase supply voltage $V_{SUPPLY}$ to the sum of threshold minimum voltage $V_{MIN}$ and a hysteresis voltage $V_{HYST}$.

Figure 4:
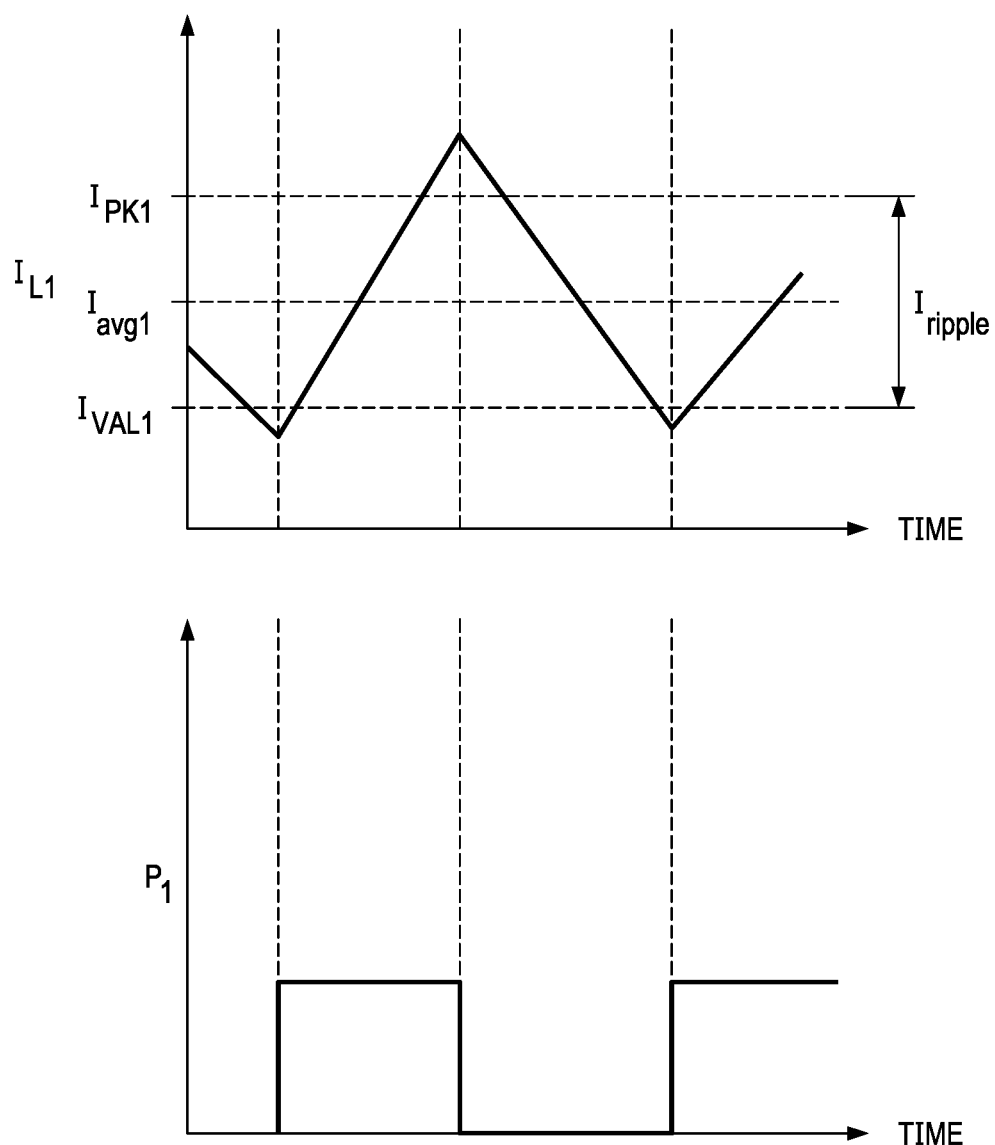
FIG. 4 illustrates a graph of inductor current through a phase of a boost converter and a control signal of switches of the phase versus time, in accordance with embodiments of the present disclosure.

As described above, when boost converter 20 operates in the boost active mode, control circuit 40 may provide hysteretic current control of inductor currents $I_{L1}$, $I_{L2}$, and $I_{L3}$ through power inductors 32A, 32B, and 32C, respectively. FIG. 4 illustrates an example graph of inductor current $I_{L1}$ and control signal $P_1$ versus time, in accordance with embodiments of the present disclosure. As shown in FIG. 4, and as described in much greater detail elsewhere in this disclosure, control circuit 40 may generate control signals $P_1$ and $\overline{P_1}$ of phase 24A such that: (a) when inductor current $I_{L1}$ falls below a valley current threshold $I_{VAL1}$, control circuit 40 may activate charge switch 34A and deactivate rectification switch 36A; and (b) when inductor current $I_{L1}$ increases above a peak current threshold $I_{PK1}$, control circuit 40 may deactivate charge switch 34A and activate rectification switch 36A. Accordingly, control circuit 40 may provide hysteretic control of inductor current $I_{L1}$ such that inductor current $I_{L1}$ varies between approximately valley current threshold $I_{VAL1}$ and approximately peak current threshold $I_{PK1}$, with inductor current $I_{L1}$ having an average current $I_{AVG1}$ and a ripple current $I_{ripple}$, such that:

$$I_{PK1} = I_{AVG1} + \frac{I_{ripple}}{2}; \text{ and}$$

$$I_{VAL1} = I_{AVG1} - \frac{I_{ripple}}{2}.$$

Control circuit 40 may also generate control signals $P_2$, $\overline{P_2}$, $P_3$, and $\overline{P_3}$ of phases 24B and 24C to provide similar or identical control of inductor currents $I_{L2}$ and $I_{L3}$.

Figure 5:
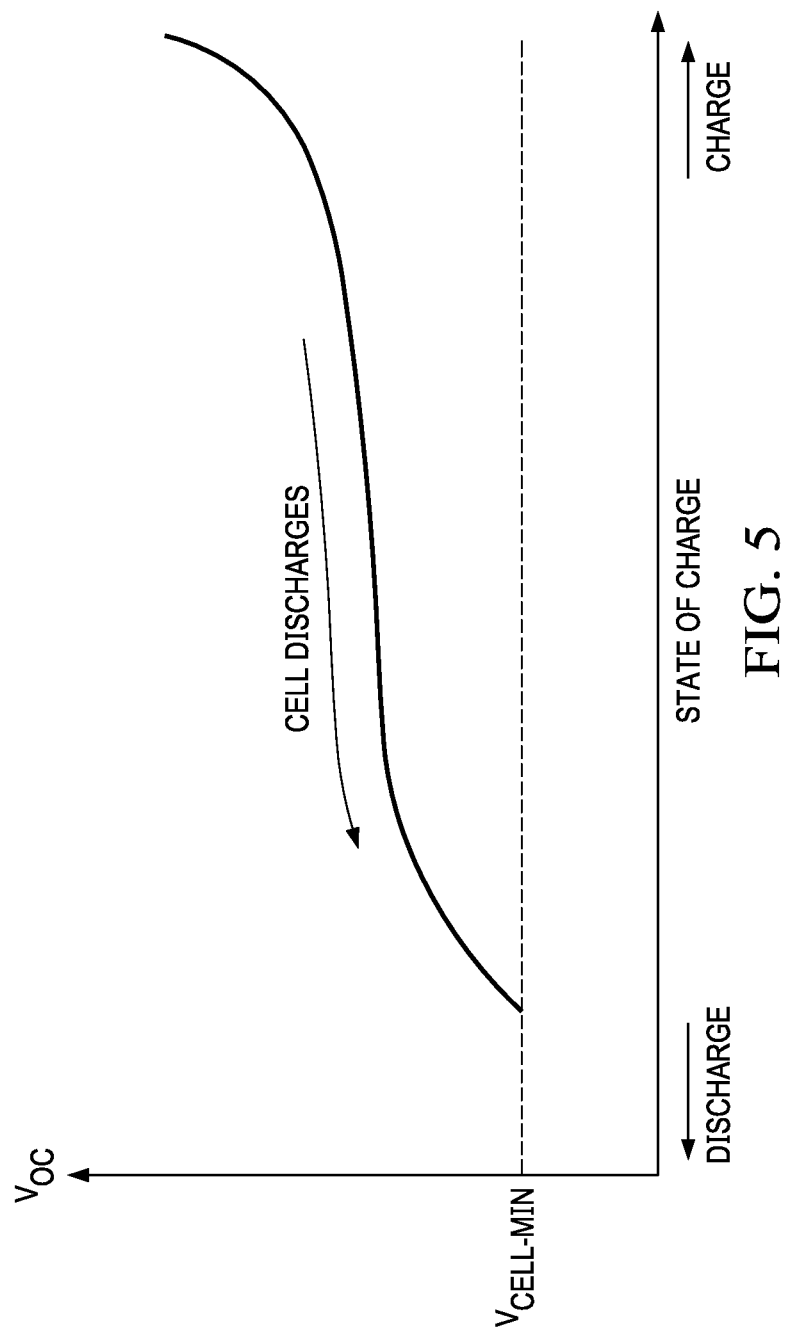
FIG. 5 illustrates an example graph of an open circuit voltage of a battery versus the battery's state of charge, in accordance with embodiments of the present disclosure.

Lithium-ion batteries are typically known to operate from 4.2 V down to 3.0 V, known as an open circuit voltage $V_{OC}$ of the battery (e.g., battery 22). As a battery discharges due to a current drawn from the battery, the state of charge of the battery may also decrease, and open circuit voltage $V_{OC}$ (which may be a function of state of charge) may also decrease as a result of electrochemical reactions taking place within the battery, as shown in FIG. 5. Outside the range of 3.0 V and 4.2 V for open circuit voltage $V_{OC}$, the capacity, life, and safety of a lithium-ion battery may degrade. For example, at approximately 3.0 V, approximately 95% of the energy in a lithium-ion cell may be spent (i.e., state of charge is 5%), and open circuit voltage $V_{OC}$ would be liable to drop rapidly if further discharge were to continue. Below approximately 2.4V, metal plates of a lithium-ion battery may erode, which may cause higher internal impedance for the battery, lower capacity, and potential short circuit. Thus, to protect a battery (e.g., battery 22) from over-discharging, many portable electronic devices may prevent operation below a predetermined end-of-discharge voltage $V_{CELL-MIN}$.

Figure 6:
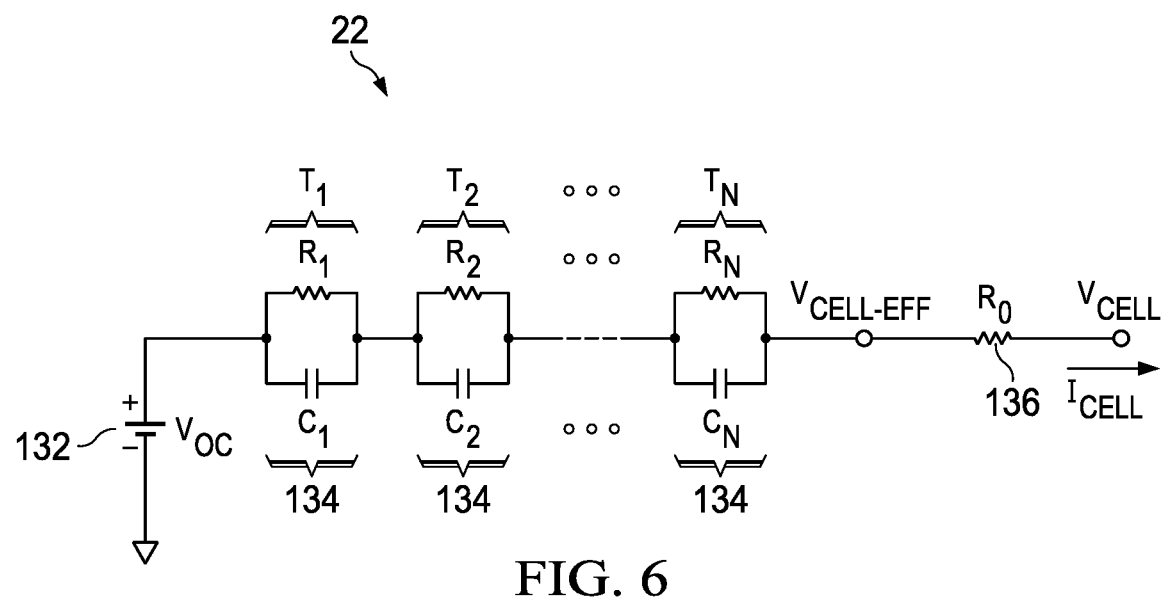
FIG. 6 illustrates a block diagram of selected components of an example equivalent circuit model for a battery, in accordance with embodiments of the present disclosure.

FIG. 6 illustrates a block diagram of selected components of an equivalent circuit model for battery 22, in accordance with embodiments of the present disclosure. As shown in FIG. 6, battery 22 may be modeled as having a battery cell 132 having an open circuit voltage $V_{OC}$ in series with a plurality of parallel resistive-capacitive sections 134 and further in series with an equivalent series resistance 136 of battery 22, such equivalent series resistance 136 having a resistance of $R_0$. Resistances $R_1$, $R_2$, ... $R_N$, and respective capacitances $C_1$, $C_2$, ..., $C_N$ may model battery chemistry-dependent time constants $\tau_1$, $\tau_2$, ..., $\tau_N$, that may be lumped with open circuit voltage $V_{OC}$ and equivalent series resistance 136. Notably, an electrical node depicted with voltage $V_{CELL-EFF}$ in FIG. 6 captures the time varying discharge behavior of battery 22, and battery voltage $V_{CELL}$ is an actual voltage seen at the output terminals of battery 22. Voltage $V_{CELL-EFF}$ may not be directly measurable, and thus battery voltage $V_{CELL}$ may be the only voltage associated with battery 22 that may be measured to evaluate battery state of health. Also of note, at a current draw of zero (e.g., $I_{CELL}=0$), battery voltage $V_{CELL}$ may be equal to voltage $V_{CELL-EFF}$ which may in turn be equal to an open circuit voltage $V_{OC}$ at a given state of charge.

Figure 7:
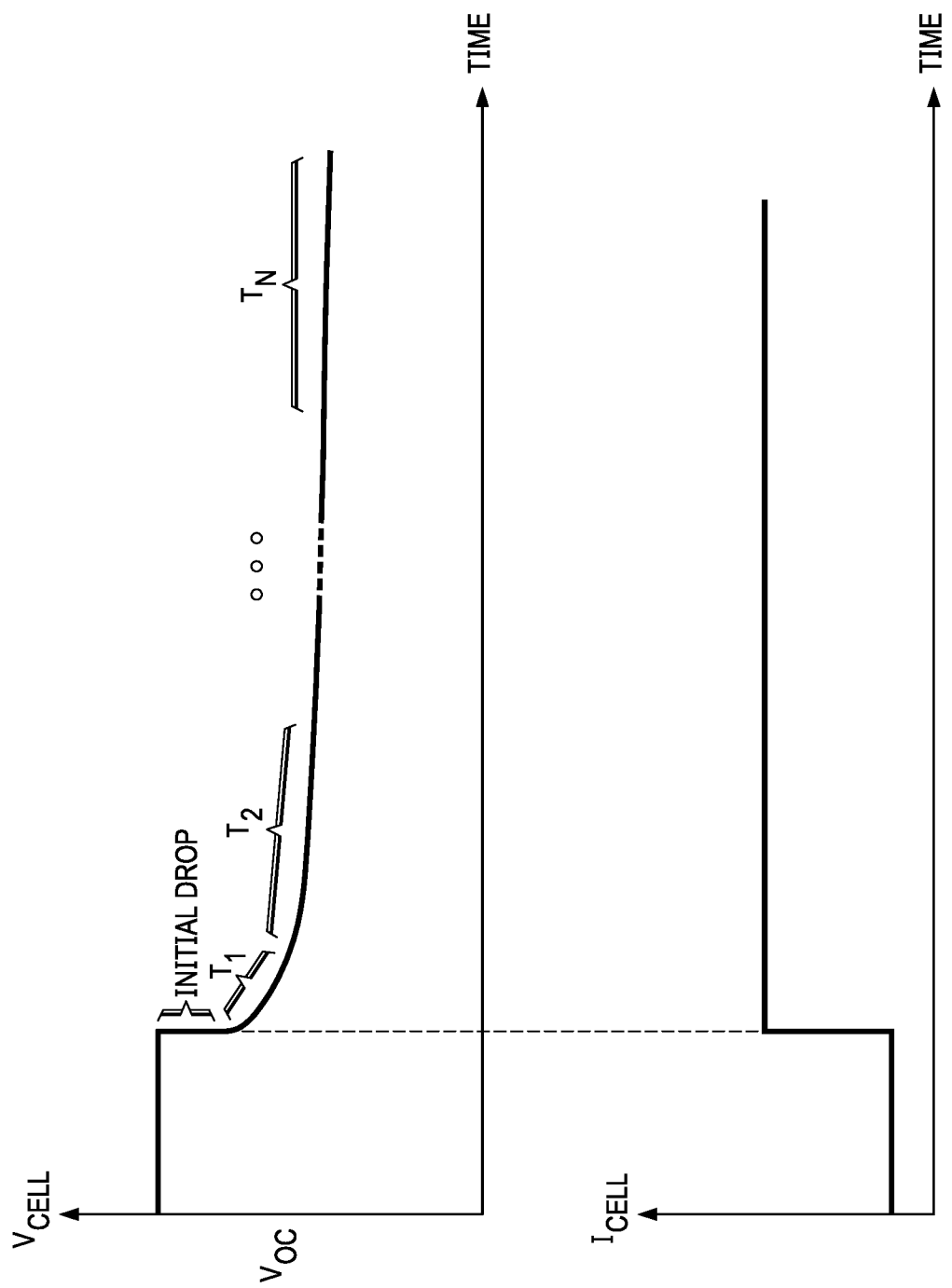
FIG. 7 illustrates an example graph of a battery voltage and a battery current versus time associated with a current step drawn from a battery, in accordance with embodiments of the present disclosure.

FIG. 7 illustrates example graphs of battery voltage $V_{CELL}$ and battery current $I_{CELL}$ versus time associated with a current step drawn from battery 22, in accordance with embodiments of the present disclosure. As shown in FIG. 7, in response to a current step event, battery voltage $V_{CELL}$ may respond to the step, as the response curve for battery voltage $V_{CELL}$ experiences an initial instantaneous drop (e.g., due to equivalent series resistance 136) and time-dependent voltage drops due to time constants $\tau_1, \tau_2, \ldots, \tau_N$. Open circuit voltage $V_{OC}$ and the various impedances $R_0, R_1, R_2, \ldots R_N$, may be a function of state of charge of battery 22, thus implying that a transient response to a new, fully-charged battery could be significantly different from that of an aged, partially-discharged battery.

In operation, control circuit 40 may determine a maximum battery current $I_{CELL}$ that may be drawn from battery 22 at any given instant based on one or more constraints, including protection of battery 22, stability of boost converter 20, and/or limitations associated with practical limitations.

Figure 8:
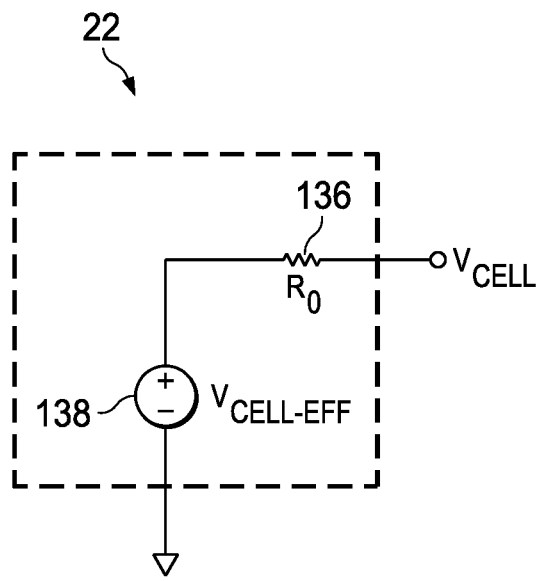
FIG. 8 illustrates an example first-order model of a battery simplified to a time-varying voltage source in series with an equivalent series resistance, in accordance with embodiments of the present disclosure.

A first constraint that may be imposed by control circuit 40 is battery-imposed limitations for the maximum of battery current $I_{CELL}$. To illustrate application of this constraint, FIG. 8 illustrates a first-order model of battery 22 simplified to a time-varying voltage source 138 with voltage $V_{CELL-EFF}$ in series with equivalent series resistance 136 having a resistance value of $R_0$, in accordance with embodiments of the present disclosure. A maximum battery current $I_{CELL-MAX}$ that battery 22 may be capable of delivering may be directly dependent on equivalent series resistance 136. Battery current $I_{CELL}$ must pass through equivalent series resistance 136, which may reduce battery voltage $V_{CELL}$ from voltage $V_{CELL-EFF}$ by an amount equal to resistance $R_0$ multiplied by battery current $I_{CELL}$ (e.g., $V_{CELL} = V_{CELL-EFF} - R_0 I_{CELL}$). Perhaps more significantly, battery current $I_{CELL}$ flowing through equivalent series resistance 136 may cause power dissipation within battery 22 that is equal to resistance $R_0$ multiplied by the square of battery current $I_{CELL}$ (e.g., $P = R_0 I_{CELL}^2$). At high rates of discharge, battery current $I_{CELL}$ may lead to significant heating within battery 22. The requirement discussed above that battery voltage $V_{CELL}$ must remain above end-of-discharge voltage $V_{CELL-MIN}$ sets a limitation on maximum battery current $I_{CELL-MAX}$, as given by:

$$I_{CELL-MAX} = \frac{V_{CELL-EFF} - V_{CELL-MIN}}{R_0}$$

Figure 9:
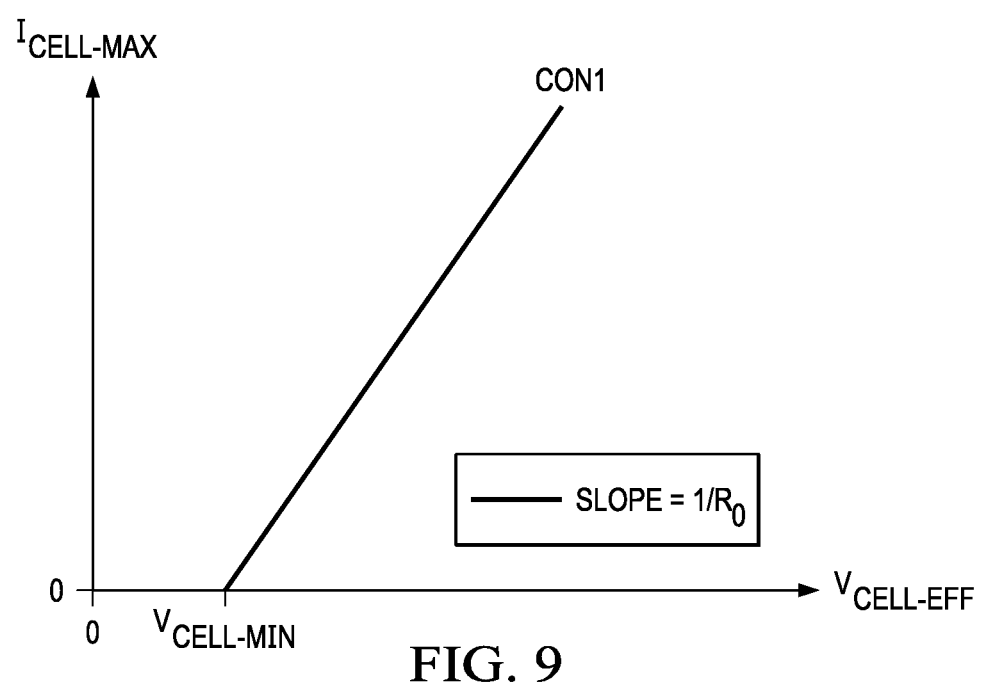
FIG. 9 illustrates an example graph of a maximum battery current versus an internal effective battery voltage for battery protection, in accordance with embodiments of the present disclosure.

Accordingly, maximum battery current $I_{CELL-MAX}$ may be a function of voltage $V_{CELL-EFF}$, assuming only battery-imposed limitations, and may be plotted as illustrated by line CON1 shown in FIG. 9.

To enforce such limitation, control circuit 40 may implement an active protection scheme to ensure that end-of-discharge voltage $V_{CELL-MIN}$ is not violated, despite transient loads on boost converter 20, so as to avoid damage to battery 22. For example, control circuit 40 may be configured to monitor battery voltage $V_{CELL}$ at terminals of battery 22 and vary maximum battery current $I_{CELL-MAX}$ drawn by boost converter 20 as shown by constraint CON1 in FIG. 9 in order to ensure battery 22 is not over-discharged or pushed beyond its safe operating range, in order to extend life of battery 22. However, complicating such control of maximum battery current $I_{CELL-MAX}$ is that the transient response of battery 22 may be a function of multiple time constants (e.g., $\tau_1, \tau_2, \ldots, \tau_N$) as described above, and it may be unfeasible or uneconomical to measure such time constants for a given battery and vary maximum battery current $I_{CELL-MAX}$ in a feedforward manner Thus, as further described below, control circuit 40 may implement a negative feedback control loop around boost converter 20 that may monitor battery voltage $V_{CELL}$ and vary maximum battery current $I_{CELL-MAX}$ to maintain battery voltage $V_{CELL}$ at a desired target value.

Figure 10:
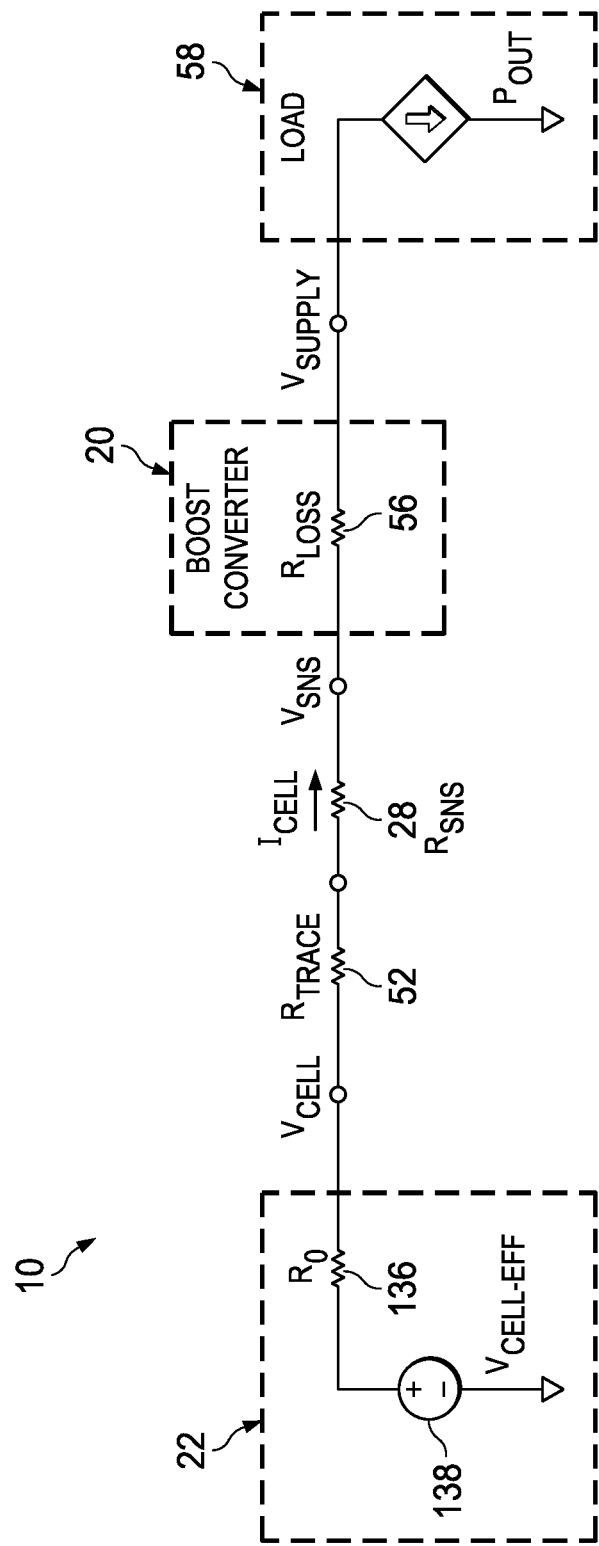
FIG. 10 illustrates a block diagram of selected impedances within the power delivery network shown in FIG. 1, in accordance with embodiments of the present disclosure.

In addition to limiting current to provide for protection of battery 22 as described above, it may also be desirable to limit current to provide stability for boost converter 20, in order to operate beyond a maximum power point into a region of instability of boost converter 20, as described in greater detail below. To illustrate, reference is made to FIG. 10, which depicts a detailed block diagram of selected impedances within power delivery network 10 shown in FIG. 2, in accordance with embodiments of the present disclosure. As shown in FIG. 10, power delivery network 10 may be modeled with battery 22 as shown in FIG. 8 in series with a trace resistor 52, sense resistor 28, an impedance 56 to model equivalent losses in boost converter 20, and a load 58 representing the aggregate of downstream devices 18. Trace resistor 52 may have a resistance $R_{TRACE}$ representing a resistance of electrical conduit between battery 22 and boost converter 20 (e.g., a connector, printed circuit board trace, etc.). Sense resistor 28 may have a resistance $R_{SNS}$ and may be used to sense battery current $I_{CELL}$ based on a voltage drop across sense resistor 28 (e.g., the difference between sense voltage $V_{SNS}$ and battery voltage $V_{CELL}$) and resistance $R_{SNS}$ in accordance with Ohm's law. Impedance 56 may model losses inside boost converter 20 with resistance $R_{Loss}$. After accounting for power losses occurring in these various impedances, boost converter 20 may deliver output power $P_{OUT}$ to load 58, given as:

$$P_{OUT} = I_{CELL} V_{CELL-EFF} - I_{CELL}^2 R_{TOT}$$

where $$R_{TOT} = R_0 + R_{TRACE} + R_{SNS} + R_{LOSS}$$

Figure 11:
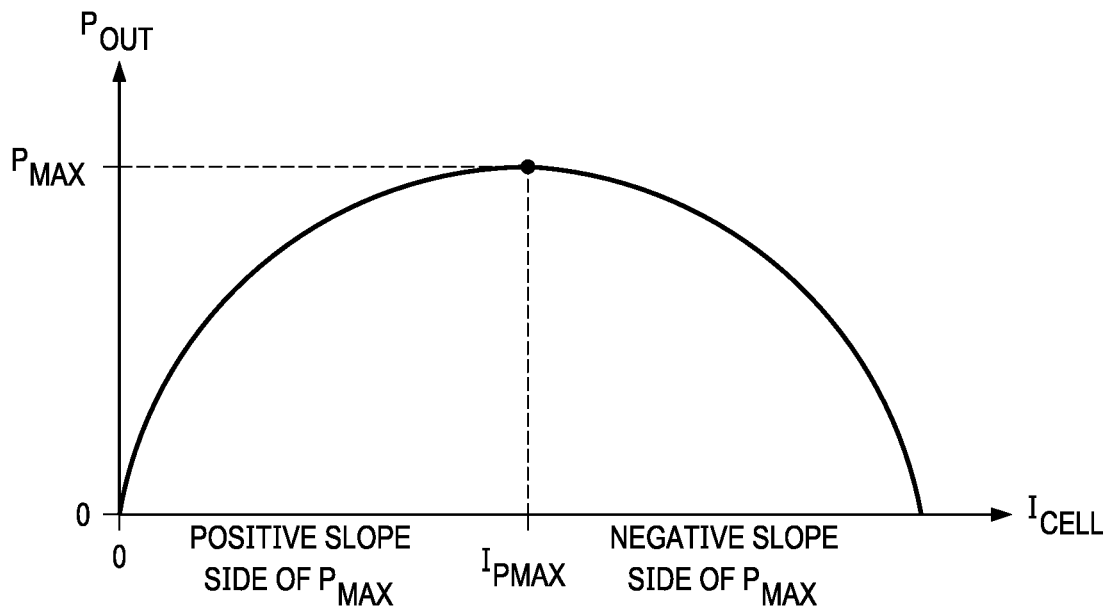
FIG. 11 illustrates an example graph of an output power of a power converter versus battery current drawn by the power converter, in accordance with embodiments of the present disclosure.

For a given total resistance $R_{TOT}$ and given voltage $V_{CELL-EFF}$, there may exist a maximum power $P_{MAX}$ for output power $P_{OUT}$ of power delivery network 10 as a function of battery current $I_{CELL}$ that occurs at a current $I_{PMAX}$, as shown in FIG. 11, where current $I_{PMAX}$ may be given by:

$$I_{PMAX} = \frac{V_{CELL-EFF}}{2R_{TOT}}$$

Figure 12:
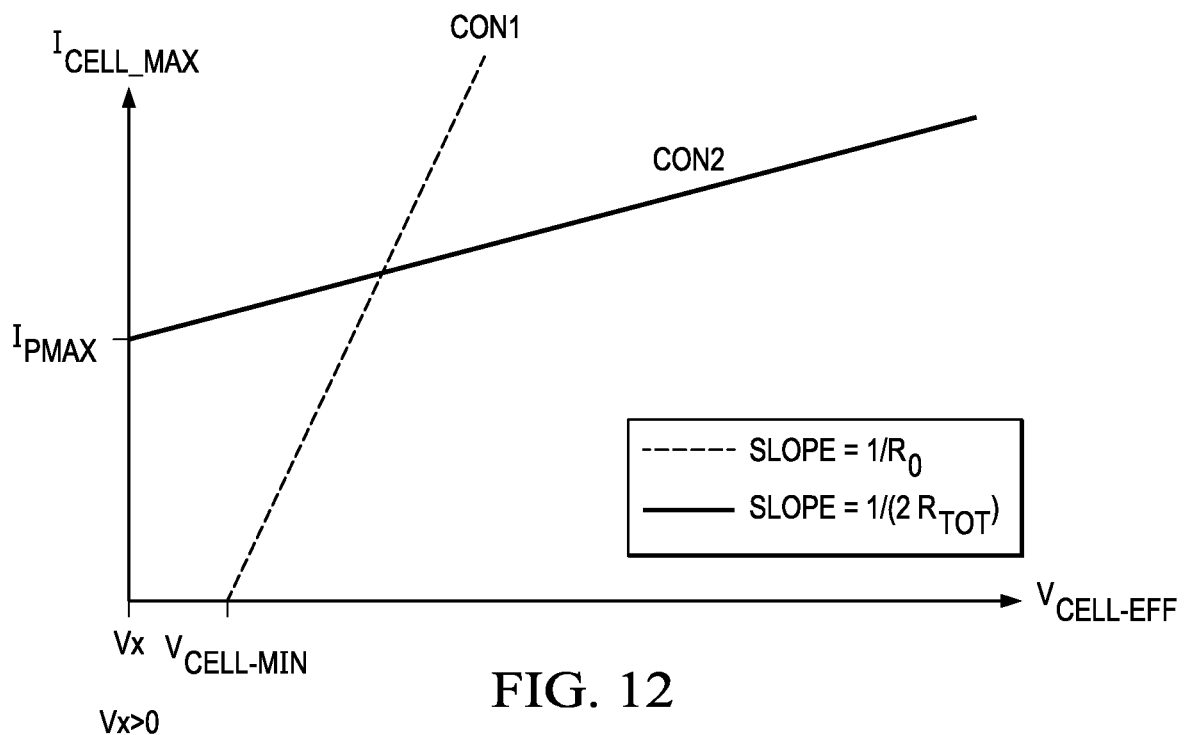
FIG. 12 illustrates an example graph of a maximum battery current versus an internal effective battery voltage for power converter stability, in accordance with embodiments of the present disclosure.

Thus, it is shown from FIG. 11 that power delivery system 10 will operate with optimum power efficiency and stability if $I_{CELL} < I_{PMAX}$, and will operate in a region of instability (negative slope of output power $P_{OUT}$ versus battery current $I_{CELL}$) when $I_{CELL} > I_{PMAX}$. This maximum allowable current $I_{PMAX}$ may be plotted as shown in FIG. 12 as constraint CON2 superimposed over constraint CON1 for maximum battery current $I_{CELL-MAX}$ depicted in FIG. 9. Because total resistance $R_{TOT}$ is greater than equivalent series resistance $R_0$, it may be evident that the slope of constraint CON1 is steeper than the slope of constraint CON2. On extrapolation, the line of constraint CON2 may intercept the horizontal axis of voltage $V_{CELL-EFF}$ at 0 V, which is not shown in FIG.

12, as many batteries (e.g., lithium-ion batteries) may not be allowed to drop to such magnitude.

For high-efficiency power converters, impedance 56 may be negligible compared to equivalent series resistance 136, trace resistor 52, and sense resistor 28, such that total resistance $R_{TOT}$ may be rewritten as:

$$R_{TOT} \approx R_0 + R_{TRACE} + R_{SNS}$$

As battery 22 is discharged with use, equivalent series resistance 136 may increase and voltage $V_{CELL-EFF}$ may decrease accordingly. Therefore, maximum allowable current $I_{PMAX}$ corresponding to maximum power $P_{MAX}$ may be a function of voltage $V_{CELL-EFF}$ and impedances of power delivery network 10.

In addition to limiting current to provide for protection of battery 22 as described above, and in addition to limiting current to provide stability for boost converter 20 as described above, it may also or alternatively be desirable to limit current based on considerations of practical implementations, as described in greater detail below.

As an example, beyond a certain voltage $V_{CELL-EFF}$, the maximum battery current $I_{CELL}$, and therefore the maximum power delivery capability $P_{MAX}$, of boost converter 20 may become so large that the design of boost converter 20 becomes increasingly difficult or even unfeasible. Practical limitations such as, for example, inductor saturation current and required dynamic range of current sensing circuitry in boost converter 20 may dictate an upper power limit $P_{LIM}$ be placed on output power $P_{OUT}$. Thermal considerations may also need to be taken into consideration and may drive a need to limit maximum power delivery from boost converter 20.

Assuming output power $P_{OUT}$ is limited to power limit $P_{LIM}$, a power balance equation for power delivery system 10 may be written as:

$$I_{CELL}^2 R_{TOT} - I_{CELL} I_{CELL-EFF} + P_{LIM} = 0$$

which can be rewritten as:

$$I_{CELL-LIM} = I_{PMAX} - \sqrt{\frac{P_{MAX} - P_{LIM}}{R_{TOT}}}$$

Figure 13:
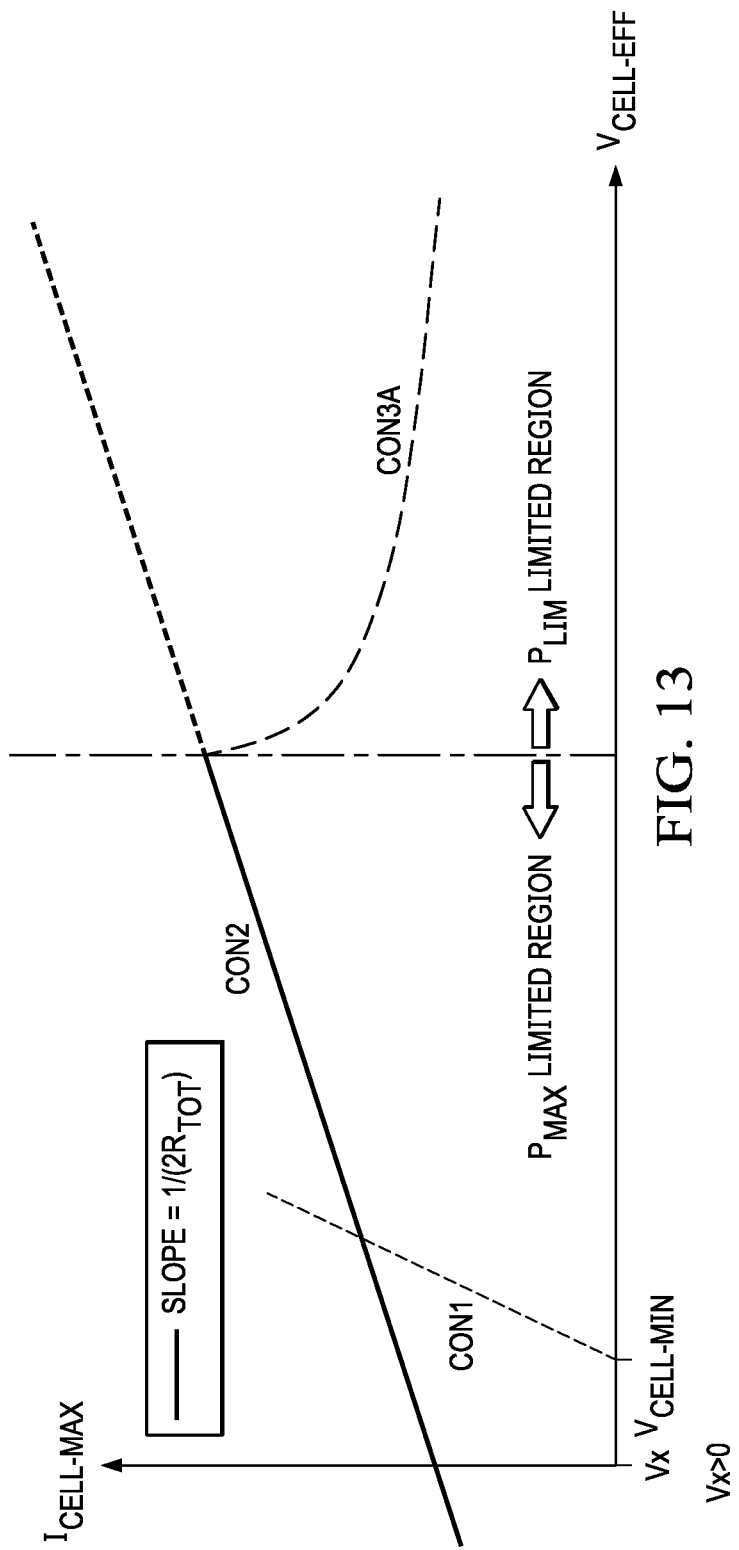
FIG. 13 illustrates an example graph of a maximum battery current versus an internal effective battery voltage for power limit considerations, in accordance with embodiments of the present disclosure.

This maximum allowable current $I_{CELL-LIM}$ may be plotted as shown in FIG. 13 as constraint CON3A superimposed over constraints CON1 and CON2 depicted in FIG. 12. A separation between two power limited regions for $P_{MAX}$ and $P_{LIM}$ are graphically shown in FIG. 13 as occurring at a breakpoint between the curves representing constraints CON2 and CON3A. In the region limited by power limit $P_{LIM}$, a maximum for battery current $I_{CELL}$ may be set by the lower of the two values for maximum allowable current. As is shown in FIG. 13, along the curve for constraint CON3A, the maximum current for battery current $I_{CELL}$ may increase as voltage $V_{CELL-EFF}$ decreases.

Figure 14:
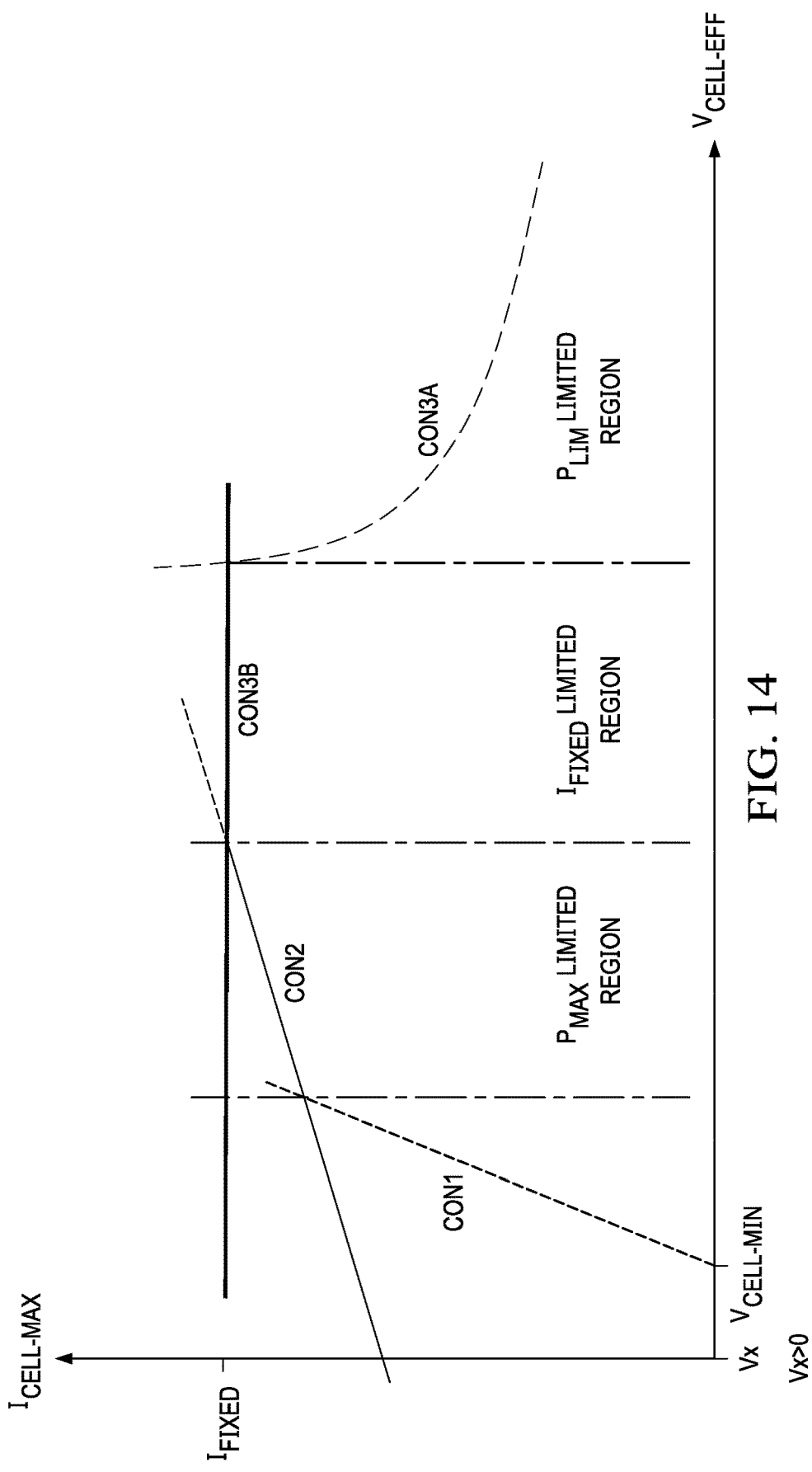
FIG. 14 illustrates an example graph of a maximum battery current versus an internal effective battery voltage for current limit considerations, in accordance with embodiments of the present disclosure.

In addition to limiting current to provide for protection of battery 22 as described above, limiting current to provide stability for boost converter 20 as described above, and limiting current for power limiting considerations, it may also or alternatively be desirable to apply a fixed current limit $I_{FIXED}$ based on considerations of practical implementations, as described in greater detail below. This maximum allowable current $I_{FIXED}$ may be plotted as shown in FIG. 14 as constraint CON3B superimposed over constraints CON1, CON2, and CON3A depicted in FIG. 13. Thus the maximum current for battery current $I_{CELL}$ may be set by the lowest of the four values for maximum allowable current.

Figure 15:
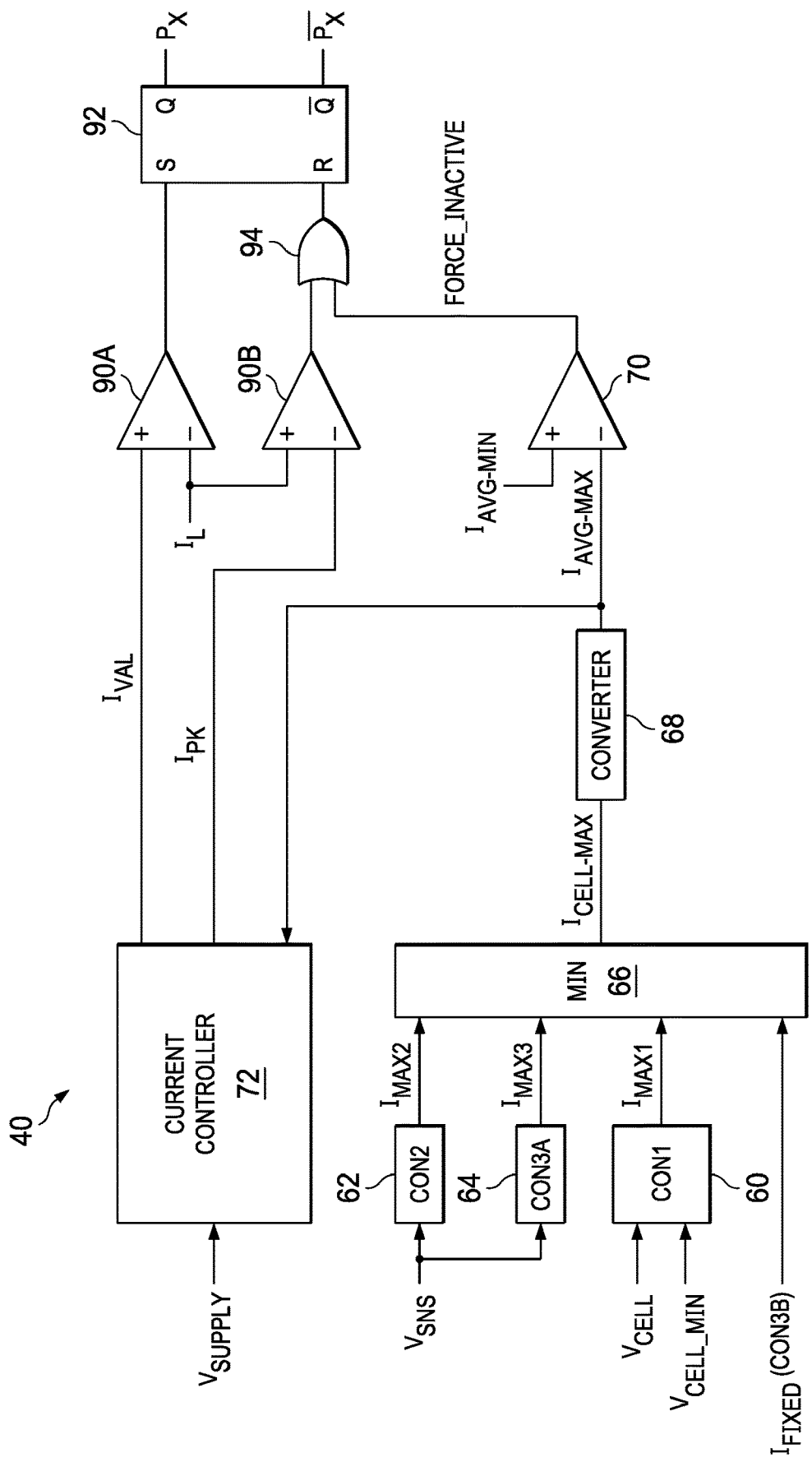
FIG. 15 illustrates a block diagram of selected components of an example control circuit for a boost converter, in accordance with embodiments of the present disclosure.

FIG. 15 illustrates a block diagram of selected components of example control circuit 40, in accordance with embodiments of the present disclosure. In order to limit the current-limiting scheme described above with reference to FIGS. 5-14, control circuit 40 may include reactive engines 60, 62, and 64 configured to apply constraints CON1, CON2, and CON3A, respectively, to generate maximum constraint currents $I_{MAX1}$, $I_{MAX2}$, and $I_{MAX3}$, respectively. A minimum block 66 may select the minimum of maximum allowable current $I_{FIXED}$ (corresponding to constraint CON3B) and maximum constraint currents $I_{MAX1}$, $I_{MAX2}$, and $I_{MAX3}$ to generate maximum battery current $I_{CELL-MAX}$. Control circuit 40 may also include a current converter 68 that may convert maximum battery current $I_{CELL}$-MAX into a maximum average current $I_{AVG-MAX}$, which establishes a maximum for target average current $I_{AVG}$ drawn by boost converter 20.

To perform peak/valley current control of boost converter 20, control circuit 40 may also include current controller 72, comparators 90A and 90B, and latch 92. Current controller 72 may, based on supply voltage $V_{SUPPLY}$, determine target average current $I_{AVG}$ to be drawn by boost converter 20 in order to regulate supply voltage $V_{SUPPLY}$ at a desired voltage level. The scope of determining target average current $I_{AVG}$ based on supply voltage $V_{SUPPLY}$ is beyond the scope of this disclosure, but may be determined in any suitable manner, including without limitation as described in U.S. patent application Ser. No. 17/119,517 filed Dec. 11, 2020, and incorporated by reference herein in its entirety. Having determined target average current $I_{AVG}$, current controller 72 may select the lesser of target average current $I_{AVG}$ and maximum average current $I_{AVG-MAX}$ as an applied target average current $I_{AVG}'$. In turn, current controller 72 may calculate peak current threshold $I_{PK}$ and valley current threshold $I_{VAL}$ in accordance with:

$$I_{PK} = I_{AVG}' + \frac{I_{ripple}}{2}; \text{ and}$$

$$I_{VAL} = I_{AVG}' - \frac{I_{ripple}}{2}.$$

Comparator 90A may be configured to compare an inductor current $I_L$ to valley current threshold $I_{VAL}$, while comparator 90B may be configured to compare an inductor current $I_L$ to peak current threshold $I_{PK}$. Latch 92 (which may be implemented as a set-reset latch or other suitable circuit or logic device) may generate control signals $P_x$ (e.g., control signals $P_1$, $P_2$, $P_3$, etc.) and $\overline{P_x}$ (e.g., control signals $\overline{P_1}$, $\overline{P_2}$, $\overline{P_3}$, etc.) for controlling switches of boost converter 20. For example, when inductor current $I_L$ falls below valley current threshold $I_{VAL}$, latch 92 may assert control signal $P_x$ and dessert control signal $\overline{P_1}$, and when inductor current $I_L$ falls below valley current threshold $I_{VAL}$, latch 92 may (assuming signal FORCE_INACTIVE shown in FIG. 15 is deasserted) deassert control signal $P_x$ and assert control signal $\overline{P_x}$, providing peak and valley current control as shown in FIG. 4.

In addition, to implement clamping of a current limit of boost converter 20 to a minimum value to ensure graceful shutdown of boost converter 20 at the end of life of battery 22, control circuit 40 may also include comparator 70 and logical OR gate 94. A motivation for such clamping may arise from the various practical limitations of boost converter 20 and other circuitry (e.g., digital-to-analog converters, comparators, and current-sensing circuits, which may or may not be explicitly shown in the FIGURES herein due to ease of clarity and exposition), which may place a limit on the lowest current value to which valley current threshold $I_{VAL}$ may be set. For example, it may not be possible to detect voltages or currents close to zero. As another example, resolution of digital-to-analog converters and finite bit-widths of digital-to-analog converters may imply a lower limit to ripple current $I_{ripple}$. These practical limitations imply that a lower limit, a minimum average current $I_{AVG\text{-}MIN}$, may exist for target average current $I_{AVG}$.

Figure 16:
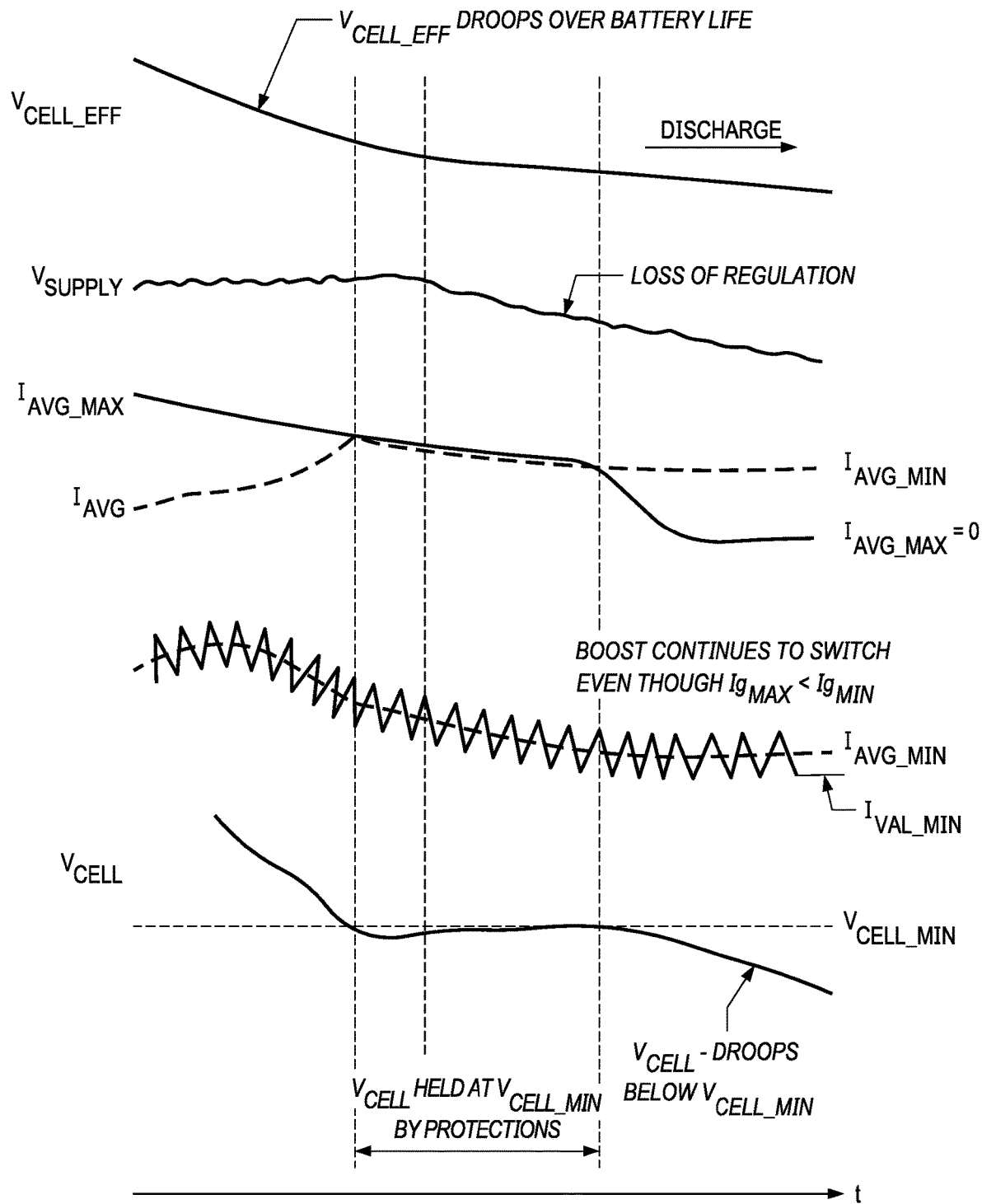
FIG. 16 illustrates a graph of various example voltage and current waveforms associated with a power delivery network without current limit clamping, in accordance with embodiments of the present disclosure.

To further illustrate motivation for current clamping, FIG. 16 illustrates a graph of various example voltage and current waveforms associated with power delivery network 10 without current limit clamping, in accordance with embodiments of the present disclosure. In particular, the waveforms shown in FIG. 16 may demonstrate various voltages and currents within with power delivery network 10 assuming that comparator 70 and logical OR gate 94 were not present in control circuit 40 shown in FIG. 15, and the output of comparator 90B fed directly into the reset input of set-reset latch 92.

As shown in FIG. 16, at the end of life of battery 22, as voltage $V_{CELL\text{-}EFF}$ decreases, maximum average current $I_{AVG\text{-}MAX}$ may be limited by constraint CON1 such that battery voltage $V_{CELL}$ does not drop below end-of-discharge voltage $V_{CELL\text{-}MIN}$. When the protection mechanism of constraint CON1 is in control, the average current drawn from battery 22, target average current $I_{AVG}$, may be limited to maximum average current $I_{AVG\text{-}MAX}$. As maximum average current $I_{AVG\text{-}MAX}$ begins to limit target average current $I_{AVG}$, the average current drawn from battery 22 may decrease as well as output power $P_{OUT}$ delivered to load 58. In the case of continual droop in voltage $V_{CELL\text{-}EFF}$, a decrease in load may not be sufficient to stem the decrease in voltage $V_{CELL\text{-}EFF}$, especially at very low states-of-charge. In such a scenario, target average current $I_{AVG}$ demanded by boost converter 20 may continue to decrease, and reach minimum average current $I_{AVG\text{-}MIN}$. At this point, supply voltage $V_{SUPPLY}$ is no longer regulated and may begin to sag or droop from its desired regulated voltage level. A feedback control loop of boost converter 20 may attempt to bring supply voltage $V_{SUPPLY}$ back into regulation, and thus control circuit 40 may cause boost converter 20 to continue to switch around minimum average current $I_{AVG\text{-}MIN}$. This continued switching, albeit at minimum average current $I_{AVG\text{-}MIN}$, may continue to drain charge from battery 22, pulling battery voltage $V_{CELL}$ below end-of-discharge voltage $V_{CELL\text{-}MIN}$, thus violating constraint CON1. The protection mechanism of constraint CON1 tries to respond by decreasing maximum average current $I_{AVG\text{-}MAX}$ down to zero. However, decreasing maximum average current $I_{AVG\text{-}MAX}$ down to zero may have little or no impact, because boost converter 20 may continue to switch at minimum average current $I_{AVG\text{-}MIN}$, essentially rendering the protection mechanism of constraint CON1 ineffective.

Thus, without current clamping, boost converter 20 continues to switch, thus violating end-of-discharge voltage $V_{CELL\text{-}MIN}$ for battery 22, even though boost converter 20 should have gracefully shut down. In an ideal case, had boost converter 20 shut down (i.e., target average current $I_{AVG}$ decreased to zero), then battery voltage $V_{CELL}$ would have remained at end-of-discharge voltage $V_{CELL\text{-}MIN}$ and not violated safe operating condition requirements for battery 22.

To prevent protection mechanism of constraint CON1 from being rendered ineffective as described in reference to FIG. 16, control circuit 40 may prevent battery voltage $V_{CELL}$ from falling below a predetermined threshold or setpoint voltage (e.g., end-of-discharge voltage $V_{CELL\text{-}MIN}$) as battery 22 approaches end of charging life. Accordingly, the protection mechanism of constraint CON1, in connection with comparator 70 and logical OR gate 94, may implement a second feedback control subsystem (e.g., the first feedback control subsystem being current control by current controller 72 to regulate supply voltage $V_{SUPPLY}$) to ensure that battery voltage $V_{CELL}$ does not fall below (or significantly below) end-of-discharge voltage $V_{CELL\text{-}MIN}$ as battery 22 approaches the end of its charging life.

In operation, when battery voltage $V_{CELL}$ is at or about end-of-discharge voltage $V_{CELL\text{-}mIN}$, and as the load increases, the second feedback control subsystem of comparator 70 and logical OR gate 94 may operate to maintain the battery voltage $V_{CELL}$ at or about end-of-discharge voltage $V_{CELL\text{-}MIN}$ by transitioning the power converter from being continuously in the boost active mode to periodically entering the boost inactive mode such that current drawn by boost converter 20 is zero in the boost inactive mode. To illustrate, in the event that maximum average current $I_{AVG\text{-}MAX}$ falls below minimum average current $I_{AVG\text{-}MIN}$, comparator 70 may assert a FORCE_INACTIVE signal, causing the output of comparator 90B to be masked by logical OR gate 94, and holding set-reset latch 92 in reset, causing boost converter 20 to cease switching until such time as a FORCE_INACTIVE signal is de-asserted.

Thus, the second feedback control subsystem of boost converter 20 may operate to compare battery voltage $V_{CELL}$ to end-of-discharge voltage $V_{CELL\text{-}MIN}$ to maintain battery voltage $V_{CELL}$ at or about end-of-discharge voltage $V_{CELL\text{-}MIN}$ until a power down event of a host system of mobile device 1 occurs, which may occur, for example, when supply voltage $V_{SUPPLY}$ falls below a power-on-reset threshold.

Figure 17:
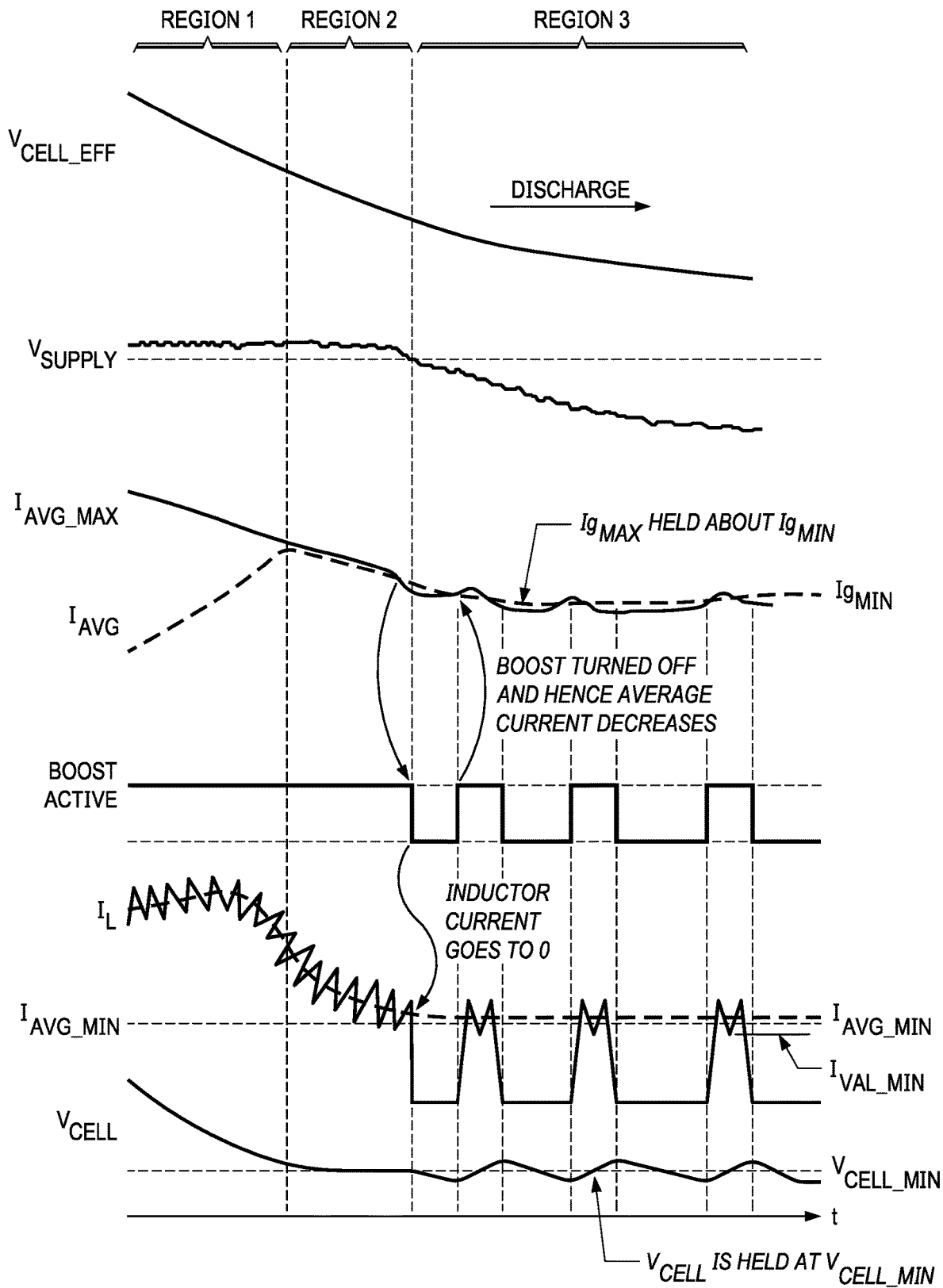
FIG. 17 illustrates a graph of various example voltage and current waveforms associated with a power delivery network with current limit clamping, in accordance with embodiments of the present disclosure.

FIG. 17 illustrates a graph of various example voltage and current waveforms associated with power delivery network 10 with current limit clamping, in accordance with embodiments of the present disclosure. As shown in FIG. 17, control circuit 40 may operate in at least three modes, each mode indicated by a region (e.g., region 1, region 2, and region 3) of FIG. 17. In region 1, in a normal mode of operation, target average current $I_{AVG}$ is below maximum average current $I_{AVG\text{-}MAX}$, and the first control subsystem of control circuit 40 implemented by current controller 72 controls current drawn by boost converter 20, without limiting constraint CON1 (e.g., $I_{AVG}'=I_{AVG}$). In region 2, however, the second control subsystem of control circuit 40 implemented by the protection mechanism of constraint CON1, comparator 70, and OR gate 94 may enter a protection mode in which it may apply maximum average current $I_{AVG\text{-}MAX}$ (e.g., $I_{AVG}'=I_{AVG\text{-}MAX}$). In region 3, the second control subsystem may reach a lower limit of current than boost converter 20 may be capable of handling, and thus the second control subsystem may enter an advanced protection mode in which it periodically disables boost converter 20 (e.g., by periodically asserting signal FORCE_INACTIVE), allowing inductor current $I_L$ to periodically decrease to zero, at maintaining battery voltage $V_{CELL}$ at or about end-of-discharge voltage $V_{CELL\text{-}MIN}$.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:
    a power source;
    a power converter having an input coupled to the power source and an output for supplying electrical energy to a load; and
    a control circuit for controlling operation of the power converter, the control circuit comprising:
        a first feedback control subsystem configured to monitor an output voltage present at the output of the power converter and regulate the output voltage at or about a predetermined regulated voltage level in a normal mode of operation of the power converter; and
        a second feedback control subsystem configured to:
            monitor an input voltage present between the power source and the input of the power converter;
            monitor a maximum current limit for the power converter based on the input voltage;
            responsive to the input voltage decreasing below a predetermined minimum voltage level, cause the power converter to operate in a protection mode of operation in order to maintain the input voltage at or about the predetermined minimum voltage level; and
            responsive to the maximum current limit falling below a minimum supported current for the power converter, causing the power converter to operate in an advanced protection mode of operation to periodically enable and disable switching of the power converter in order to maintain the input voltage at or about the predetermined minimum voltage level.

2. The system of claim 1, wherein the power converter is a boost converter.

3. The system of claim 1, wherein the predetermined minimum voltage level is based on a minimum voltage level for the power source.

4. The system of claim 1, wherein the power source is a battery.

5. The system of claim 4, wherein the predetermined minimum voltage level is based upon an end-of-discharge voltage for the battery.

6. The system of claim 4, wherein the predetermined minimum voltage level is based upon a minimum allowable voltage at which the battery is permitted to operate.

7. A method comprising, in a system including a power source and a power converter having an input coupled to the power source and an output for supplying electrical energy to a load:
    monitoring, with a first feedback control system, an output voltage present at the output of the power converter and regulating the output voltage at or about a predetermined regulated voltage level in a normal mode of operation of the power converter;
    monitoring, with a second feedback control subsystem, an input voltage present between the power source and the input of the power converter;
    monitoring, by the second feedback control subsystem, a maximum current limit for the power converter based on the input voltage;
    responsive to the input voltage decreasing below a predetermined minimum voltage level, causing, by the second feedback control subsystem, the power converter to operate in a protection mode of operation in order to maintain the input voltage at or about the predetermined minimum voltage level; and
    responsive to the maximum current limit falling below a minimum supported current for the power converter, causing, by the second feedback control subsystem, the power converter to operate in an advanced protection mode of operation to periodically enable and disable switching of the power converter in order to maintain the input voltage at or about the predetermined minimum voltage level.

8. The method of claim 7, wherein the power converter is a boost converter.

9. The method of claim 7, wherein the predetermined minimum voltage level is based on a minimum voltage level for the power source.

10. The method of claim 7, wherein the power source is a battery.

11. The method of claim 10, wherein the predetermined minimum voltage level is based upon an end-of-discharge voltage for the battery.

12. The method of claim 10, wherein the predetermined minimum voltage level is based upon a minimum allowable voltage at which the battery is permitted to operate.

13. A mobile device comprising:
a power source;
a power converter having an input coupled to the power source and an output for supplying electrical energy;
one or more components downstream of the power converter and configured to receive power from the electrical energy supplied by the power converter; and
a control circuit for controlling operation of the power converter, the control circuit comprising:
a first feedback control subsystem configured to monitor an output voltage present at the output of the power converter and regulate the output voltage at or about a predetermined regulated voltage level in a normal mode of operation of the power converter; and
a second feedback control subsystem configured to:
monitor an input voltage present between the power source and the input of the power converter;
monitor a maximum current limit for the power converter based on the input voltage;
responsive to the input voltage decreasing below a predetermined minimum voltage level, cause the power converter to operate in a protection mode of operation in order to maintain the input voltage at or about the predetermined minimum voltage level; and
responsive to the maximum current limit falling below a minimum supported current for the power converter, causing the power converter to operate in an advanced protection mode of operation to periodically enable and disable switching of the power converter in order to maintain the input voltage at or about the predetermined minimum voltage level.

14. The mobile device of claim 13, wherein the power converter is a boost converter.

15. The mobile device of claim 13, wherein the predetermined minimum voltage level is based on a minimum voltage level for the power source.

16. The mobile device of claim 13, wherein the power source is a battery.

17. The mobile device of claim 16, wherein the predetermined minimum voltage level is based upon an end-of-discharge voltage for the battery.

18. The mobile device of claim 16, wherein the predetermined minimum voltage level is based upon a minimum allowable voltage at which the battery is permitted to operate.

* * * * *